(12) United States Patent
Bezryadin (10) Patent No.: US 7,639,396 B2
(45) Date of Patent: *Dec. 29, 2009

(54) EDITING OF DIGITAL IMAGES, INCLUDING (BUT NOT LIMITED TO) HIGHLIGHTING AND SHADOWING OF IMAGE AREAS

(75) Inventor: Sergey N. Bezryadin, San Francisco, CA (US)

(73) Assignee: KWE International, Inc., South San Francisco, CA (US)

(*) Notice: Subject to any disclaimer, the term of this patent is extended or adjusted under 35 U.S.C. 154(b) by 527 days.

This patent is subject to a terminal disclaimer.

(21) Appl. No.: 11/494,393

(22) Filed: Jul. 26, 2006

(65) Prior Publication Data

US 2007/0154083 A1 Jul. 5, 2007

Related U.S. Application Data

(63) Continuation-in-part of application No. 11/377,161, filed on Mar. 16, 2006, now Pat. No. 7,486,418, which is a continuation-in-part of application No. 11/321,443, filed on Dec. 28, 2005, now Pat. No. 7,489,420, and a continuation-in-part of application No. 11/322,111, filed on Dec. 28, 2005, now Pat. No. 7,495,800.

(51) Int. Cl.
| | |
|---|---|
| G06F 15/00 | (2006.01) |
| G06K 1/00 | (2006.01) |
| G03F 3/06 | (2006.01) |
| G06T 17/00 | (2006.01) |
| G09G 5/00 | (2006.01) |
| H04N 1/60 | (2006.01) |

(52) U.S. Cl. .................. 358/1.9; 358/518; 358/520; 345/428; 345/581

(58) Field of Classification Search .................. 358/1.9, 358/518, 504, 520, 530, 515, 443; 348/419, 348/428, 581; 345/428, 581

See application file for complete search history.

(56) References Cited

U.S. PATENT DOCUMENTS

5,285,297 A * 2/1994 Rose et al. .................. 358/518

(Continued)

FOREIGN PATENT DOCUMENTS

EP 0635971 1/1995

(Continued)

OTHER PUBLICATIONS

International Search Report for International Application No. PCT/US06/62421, 3 pages, Oct. 2007.

(Continued)

*Primary Examiner*—Twyler L Hasksins
*Assistant Examiner*—Jonathan R Beckley
(74) *Attorney, Agent, or Firm*—Haynes and Boone, LLP; Michael Shenker (57) ABSTRACT

In a digital image having pixels $p_i$ (i=1, 2, ...) and a brightness $B(p_i)$ at each pixel $p_i$, the global dynamic range of an image is changed by replacing the brightness $B(p_i)$ with the brightness $B^*(p_i)=B(p_i)\times(B_0/B_{avg}(p_i))^\epsilon$, where $B_0$ and $\epsilon$ are predefined constants, and $B_{avg}(p_i)$ is some average brightness value, e.g. the mean brightness over a region $R(p_i)$ containing the pixel $p_i$. The local dynamic range is not changed significantly in some embodiments. The brightness of an image at a pixel can be defined so that multiplication of the brightness by a positive value k corresponds to multiplication of tristimulus values by k. In some embodiments, a color coordinate system is used with the brightness being one of the coordinates.

23 Claims, 4 Drawing Sheets

U.S. PATENT DOCUMENTS

| | | | |
|---|---|---|---|
| 5,434,683 A * | 7/1995 | Sekine et al. | 358/520 |
| 5,515,172 A * | 5/1996 | Shiau | 358/520 |
| 6,239,886 B1 * | 5/2001 | Klassen et al. | 358/518 |
| 6,262,812 B1 | 7/2001 | Chan et al. | |
| 6,320,668 B1 * | 11/2001 | Kim | 358/1.1 |
| 6,476,793 B1 * | 11/2002 | Motoyama et al. | 345/589 |
| 6,724,435 B2 * | 4/2004 | Segman | 348/576 |
| 6,778,185 B1 | 8/2004 | Moroney | |
| 6,867,883 B1 * | 3/2005 | Cholewo et al. | 358/1.9 |
| 7,046,400 B2 * | 5/2006 | Gindele et al. | 358/3.27 |
| 7,116,443 B2 * | 10/2006 | Handley et al. | 358/1.9 |
| 7,167,276 B2 * | 1/2007 | Wang et al. | 358/1.9 |
| 2003/0206307 A1 | 11/2003 | Handley et al. | |
| 2004/0075852 A1 | 4/2004 | Wang et al. | |
| 2005/0128499 A1 * | 6/2005 | Glickman | 358/1.9 |

FOREIGN PATENT DOCUMENTS

| | | |
|---|---|---|
| EP | 1708480 | 10/2006 |

OTHER PUBLICATIONS

Written Opinion for International Application No. PCT/US06/62421, 10 pages, Oct. 2007.

Supplementary European Search Report for EP Application No. 06 84 8818, Jun. 26, 2009, 7 pages.

"Color Conversion Algorithms" http://www.cs.rit.edu/~ncs/color/t_convert.html pp. 1-5, Feb. 2000.

Pascale, Danny "A Comparison Of Four Multimedia RGB Spaces" pp. 1-13, Oct. 6, 2003.

Sharma, Gaurav; Vrhel, Michael J.; Trussell, H. Joel "Color Imaging for Multimedia" Proceedings of the IEEE, vol. 86, No. 6, Jun. 1998, pp. 1088-1108.

Worthey, James A. "Color Matching with Amplitude Not Left Out" pp. 1-6, Aug. 2004.

Farrell, Joyce E.; Cupitt, John; Saunders, David; Wandell, Brian A. "Estimating Spectral Reflectances of Digital Artwork" pp. 1-7, 1999.

"Basic sRGB Math—A Standard Default Color Space for the Internet—sRGB" http://www.srgb.com/basicsofsrgb.htm pp. 1-3, Nov. 1996.

Poynton, Charles "Color FAQ—Frequently Asked Question Color" http://www.poynton.com/notes/colour_and_gamma/ColorFAQ.html pp. 1-25 Nov. 28, 2006.

Hoffmann, Gernot "Color Order Systems RGB, HLS, HSB" pp. 1-10, May 2001.

Bezryadin, Sergey; Bourov, Pavel "Color Coordinate System for Accurate Color Image Editing Software," The International Conference, Printing Technology, SPb '06, Conference Proceedings Book, Jun. 26-30, St. Petersburg, Russia, pp. 145-148.

MacAdam, "Orthogonal Color Matching Functions", Journal of the Optical Society of America, 1954, vol. 44, pp. 713-724.

Cohen, Jozef "Two Preferred Reference Frames in Fundamental Color Space" *Visual Color And Color Mixture: The Fundamental Color Space*, Huguette Cohen, 2001, pp. 94-95, 100-103.

\* cited by examiner

| (-2,-2) B(-2,2) | (-1,-2) B(-1,2) | (0,-2) B(0,2) | (1,-2) B(1,2) | (2,-2) B(2,2) | ... | (m-1,-2) B(m-1,2) | (m,-2) B(m,2) | (m+1,-2) B(m+1,2) |
|---|---|---|---|---|---|---|---|---|
| (-2,-1) B(-2,1) | (-1,-1) B(-1,1) | (0,-1) B(0,1) | (1,-1) B(1,1) | (2,-1) B(2,1) | ... | (m-1,-1) B(m-1,1) | (m,-1) B(m,1) | (m+1,-1) B(m+1,1) |
| (-2,0) B(2,0) | (-1,0) B(1,0) | (0,0) | (1,0) | (2,0) | ... | (m-1,0) | (m,0) B(m-2,0) | (m+1,0) B(m-3,0) |
| (-2,1) B(2,1) | (-1,1) B(1,1) | (0,1) | (1,1) | (2,1) | ... | (m-1,1) | (m,1) B(m-2,1) | (m+1,1) B(m-3,1) |
| ⋮ 610 | | | | | ⋮ | | ⋮ | |
| (-2,n-1) B(2,n-1) | (-1,n-1) B(1,n-1) | (0,n-1) | (1,n-1) | (2,n-1) | ... | (m-1,n-1) | (m,n-1) B(m-2,n-1) | (m+1,n-1) B(m-3,n-1) |
| (-2,n) B(-2,n-2) | (-1,n) B(-1,n-2) | (0,n) B(0,n-2) | (1,n) B(1,n-2) | (2,n) B(2,n-2) | ... | (m-1,n) B(m-1,n-2) | (m,n) B(m,n-2) | (m+1,n) B(m+1,n-2) |
| (-2,n+1) B(-2,n-3) | (-1,n+1) B(-1,n-3) | (0,n+1) B(0,n-3) | (1,n+1) B(1,n-3) | (2,n+1) B(2,n-3) | ... | (m-1,n+1) B(m-1,n-3) | (m,n+1) B(m,n-3) | (m+1,n+1) B(m+1,n-3) |

EDITING OF DIGITAL IMAGES, INCLUDING (BUT NOT LIMITED TO) HIGHLIGHTING AND SHADOWING OF IMAGE AREAS

CROSS REFERENCE TO RELATED APPLICATIONS

The present application is a continuation-in-part of U.S. patent application Ser. No. 11/377,161, filed Mar. 16, 2006 now U.S. Pat. No. 7,486,418 by Sergey N. Bezryadin, entitled "EDITING (INCLUDING CONTRAST AND SHARPNESS EDITING) OF DIGITAL IMAGES", incorporated herein by reference, which is (i) a continuation-in-part of U.S. patent application Ser. No. 11/321,443, filed Dec. 28, 2005 now U.S. Pat. No. 7,489,420 by Sergey N. Bezryadin, entitled "COLOR EDITING (INCLUDING BRIGHTNESS EDITING) USING COLOR COORDINATE SYSTEMS INCLUDING SYSTEMS WITH A COORDINATE DEFINED BY A SQUARE ROOT OF A QUADRATIC POLYNOMIAL IN TRISTIMULUS VALUES AND, POSSIBLY, BY A SIGN OF A FUNCTION OF ONE OR MORE OF TRISTIMULUS VALUES", incorporated herein by reference, and (ii) which is a continuation-in-part of U.S. patent application Ser. No. 11/322,111, filed Dec. 28, 2005 now U.S. Pat. No. 7,495,800 by Sergey N. Bezryadin, entitled "COLOR COORDINATE SYSTEMS INCLUDING SYSTEMS WITH A COORDINATE DEFINED BY A SQUARE ROOT OF A QUADRATIC POLYNOMIAL IN TRISTIMULUS VALUES AND, POSSIBLY, BY A SIGN OF A FUNCTION OF ONE OR MORE OF TRISTIMULUS VALUES", incorporated herein by reference.

BACKGROUND OF THE INVENTION

The present invention relates to editing of digital images, including both color and monochromatic images. A digital representation of an image can be stored in a storage device (e.g. a computer memory, a digital video recorder, or some other device). Such representation can be transmitted over a network, and can be used to display the image on a computer monitor, a television screen, a printer, or some other device. The image can be edited using a suitable computer program.

Figure 1:
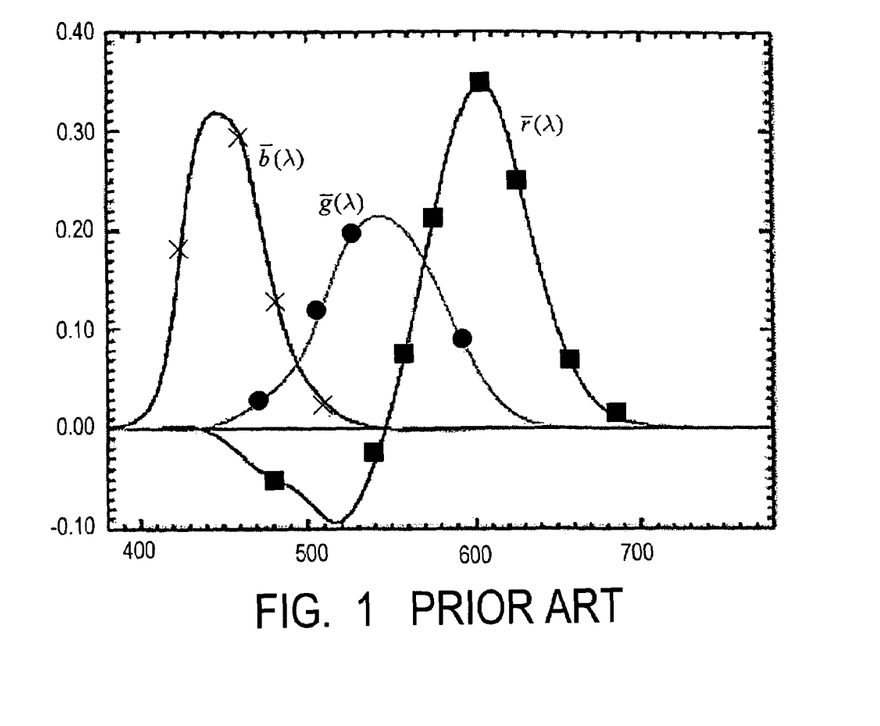
FIGS. 1 and 2 are graphs of color matching functions for prior art color coordinate systems.

Color is a sensation caused by electromagnetic radiation (light) entering a human eye. The light causing the color sensation is called "color stimulus". Color depends on the radiant power and spectral composition of the color stimulus, but different stimuli can cause the same color sensation. Therefore, a large number of colors can be reproduced ("matched") by mixing just three "primary" color stimuli, e.g. a Red, a Blue and a Green. The primary stimuli can be produced by three "primary" light beams which, when mixed and reflected from an ideal diffuse surface, produce a desired color. The color can be represented by its coordinates, which specify the intensities of the primary light beams. For example, in linear RGB color coordinate systems, a color S is represented by coordinates R, G, B which define the intensities of the respective Red, Green and Blue primary light beams needed to match the color S. If $P(\lambda)$ is the radiance (i.e. the energy per unit of time per unit wavelength) of a light source generating the color S, then the RGB coordinates can be computed as:

$$R = \int_0^\infty P(\lambda)\bar{r}(\lambda)\,d\lambda \quad (1)$$

$$G = \int_0^\infty P(\lambda)\bar{g}(\lambda)\,d\lambda$$

$$B = \int_0^\infty P(\lambda)\bar{b}(\lambda)\,d\lambda$$

where $\bar{r}(\lambda)$, $\bar{g}(\lambda)$, $\bar{b}(\lambda)$ are "color matching functions" (CMF's). For each fixed wavelength $\lambda$, the values $\bar{r}(\lambda)$, $\bar{g}(\lambda)$, $\bar{b}(\lambda)$ are respectively the R, G and B values needed to match color produced by a monochromatic light of the wavelength $\lambda$ of a unit radiance. The color matching functions are zero outside of the visible range of the $\lambda$ values, so the integration limits in (1) can be replaced with the limits of the visible range. The integrals in (1) can be replaced with sums if the radiance $P(\lambda)$ is specified as power at discrete wavelengths. FIG. 1 illustrates the color matching functions for the 1931 CIE RGB color coordinate system for a 2° field. (CIE stands for "Commission Internationale de l'Eclairage".) See D. Malacara, "Color Vision and Colorimetry: theory and applications" (2002), and Wyszecki & Stiles, "Color Science: concepts and Methods, Quantitative Data and Formulae" ($2^{nd}$ Ed. 2000), both incorporated herein by reference.

The RGB system of FIG. 1 is called linear because, as shown by equations (1), the R, G, and B values are linear in $P(\lambda)$. In a linear system, the intensities such as R, G, B are called "tristimulus values".

As seen from FIG. 1, the function $\bar{r}(\lambda)$ can be negative, so the R coordinate can be negative. If R is negative, this means that when the color S is mixed with |R| units of the Red primary, the resulting color matches the mixture of G units of the Green primary with B units of the Blue primary.

New linear color coordinate systems can be obtained as non-degenerate linear transformations of other systems. For example, the 1931 CIE XYZ color coordinate system for a 2° field is obtained from the CIE RGB system of FIG. 1 using the following transformation:

$$\begin{bmatrix} X \\ Y \\ Z \end{bmatrix} = A_{RGB-XYZ} \begin{bmatrix} R \\ G \\ B \end{bmatrix} \quad (2)$$

where:

$$A_{RGB-XYZ} = \frac{1}{0.17697} \begin{bmatrix} 0.49 & 0.31 & 0.20 \\ 0.17697 & 0.81240 & 0.01063 \\ 0.00 & 0.01 & 0.99 \end{bmatrix} \quad (3)$$

Figure 2:
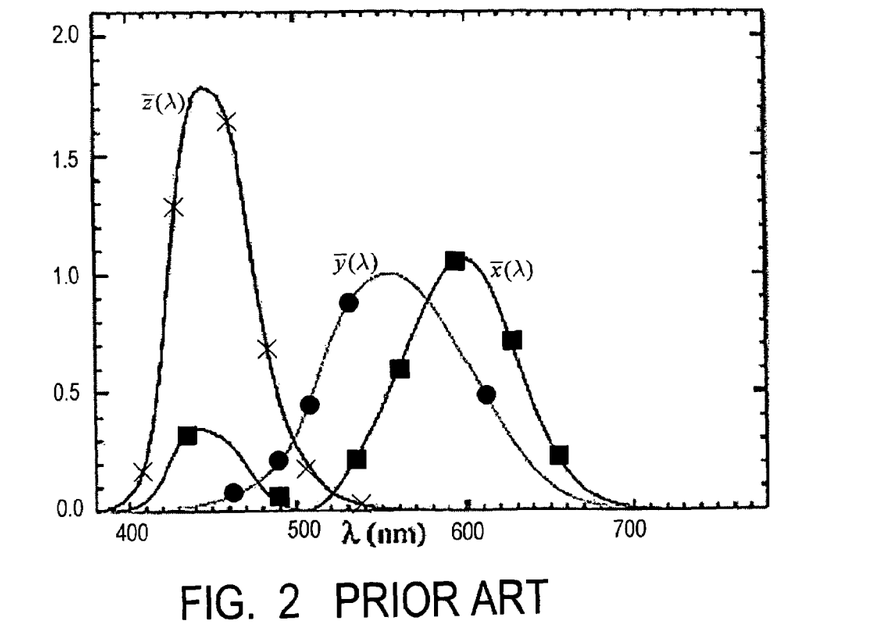

This XYZ system does not correspond to real, physical primaries. The color matching functions $\bar{x}(\lambda)$, $\bar{y}(\lambda)$, $\bar{z}(\lambda)$ for this XYZ system are shown in FIG. 2. These color matching functions are defined by the same matrix $A_{RGB-XYZ}$:

$$\begin{bmatrix} \bar{x}(\lambda) \\ \bar{y}(\lambda) \\ \bar{z}(\lambda) \end{bmatrix} = A_{RGB-XYZ} \begin{bmatrix} \bar{r}(\lambda) \\ \bar{g}(\lambda) \\ \bar{b}(\lambda) \end{bmatrix}$$

The tristimulus values X, Y, Z can be computed from the color matching functions in the usual way:

$$X = \int_0^\infty P(\lambda)\bar{x}(\lambda)\,d\lambda \qquad (4)$$
$$Y = \int_0^\infty P(\lambda)\bar{y}(\lambda)\,d\lambda$$
$$Z = \int_0^\infty P(\lambda)\bar{z}(\lambda)\,d\lambda$$

There are also non-linear color coordinate systems. One example is a non-linear sRGB system standardized by International Electrotechnical Commission (IEC) as IEC 61966-2-1. The sRGB coordinates can be converted to the XYZ coordinates (4) or the CIE RGB coordinates (1). Another example is HSB (Hue, Saturation, Brightness). The HSB system is based on sRGB. In the HSB system, the colors can be visualized as points of a vertical cylinder. The Hue coordinate is an angle on the cylinder's horizontal circular cross section. The pure Red color corresponds to Hue=0°; the pure Green to Hue=120°; the pure Blue to Hue=240°. The angles between 0° and 120° correspond to mixtures of the Red and the Green; the angles between 120° and 240° correspond to mixtures of the Green and the Blue; the angles between 240° and 360° correspond to mixtures of the Red and the Blue. The radial distance from the center indicates the color's Saturation, i.e. the amount of White (White means here that R=G=B). At the circumference, the Saturation is maximal, which means that the White amount is 0 (this means that at least one of the R, G, and B coordinates is 0). At the center, the Saturation is 0 because the center represents the White color (R=G=B). The Brightness is measured along the vertical axis of the cylinder, and is defined as max(R,G,B).

Different color coordinate systems are suitable for different purposes. For example, the sRGB system is convenient for rendering color on certain types of monitors which recognize the sRGB coordinates and automatically convert these coordinates into color. The HSB system is convenient for some color editing operations including brightness adjustments.

Brightness can be thought of as a degree of intensity of a color stimulus. Brightness corresponds to our sensation of an object being "bright" or "dim". Brightness has been represented as the Y value of the XYZ system of FIG. 2, or as the maximum of the R, G and B coordinates of the sRGB coordinate system. Other representations also exist. The saturation can be thought of as a measure of the white amount in the color.

Sharpness relates to object boundary definition. The image is sharp if the object boundaries are well defined. The image is blurry if it is not sharp.

It is sometimes desirable to highlight an image area, i.e. to increase its brightness, without making large changes to other image areas. Conversely, it may be desirable to shadow (i.e. to dim) a selected image area without making large changes in other image areas.

SUMMARY

This section summarizes some features of the invention. The invention is not limited to these features. The invention is defined by the appended claims.

The inventor has observed that it is sometimes desirable to change the global dynamic range of an image without making large changes to the local dynamic range. A dynamic range is the ratio of the maximum brightness $B_{max}$ to the minimum brightness $B_{min}$. (The brightness can be defined in a number of ways some of which are discussed below.) For the global dynamic range, the maximum and minimum brightness values are computed over the whole image (or a large portion of the image). For a local dynamic range, the maximum and minimum brightness values are computed over a small area. Below, "dynamic range" of an image is presumed global unless stated to the contrary. Suppose, for example, that an image has a (global) dynamic range DR=3000 (i.e. $B_{max}/B_{min}$=3000), and the image must be displayed on a monitor capable of a maximum dynamic range of only 300. This could be achieved simply by dividing the brightness $B(p_i)$ at each pixel $p_i$ by 10. However, some portions of the image may be adequately displayable without any change to their brightness, and dividing the brightness by 10 at these portions may result in image deterioration. For example, suppose that the brighter image portions can be displayed on the monitor without any brightness change, while the dimmer portions are outside of the monitor's range. Dividing the brightness by 10 would not improve the display of the dimmer portions. This could also cause deterioration of the brighter portions. It may be desirable to brighten (highlight) the dimmer portions without making large changes to the brighter portions so that the global dynamic range DR* (after editing) would become 300. The dynamic range of small image areas ("local dynamic range") should preferably undergo little modification.

In some embodiments, the image editing is performed by changing the brightness value $B(p_i)$ at each pixel $p_i$ to a value $B^*(p_i)$ such that:

$$B^*(p_i) = f(B(p_i), B_{avg}(p_i)) \qquad (4A)$$

where $B_{avg}(p_i)$ is some average brightness value (e.g. the mean brightness) in an image region $R(p_i)$ containing the pixel $p_i$, and $f$ is a predefined function such that for all i, the function $f(B(p_i),y)$ is strictly monotonic in y for each $B(p_i)$, and for each $B_{avg}(p_i)$, the function $f(x,B_{avg}(p_i))$ is strictly increasing in x. For example, in some embodiments, $$B^*(p_i) = B(p_i) \times (B_0/B_{avg}(p_i))^\epsilon \qquad (4B)$$

where $B_0$ and $\epsilon$ are some constants.

Consider again the example above, with dimmer areas outside of the monitor's range. It is desirable to "highlight" the dimmer image areas to increase their brightness so that the global dynamic range would become 300, but the brightness of the bright image areas would not change much. In some embodiments, this is accomplished via the image editing according to (4B). The value $B_0$ is set to the maximum brightness value $B_{max}$ over the initial image, and $\epsilon$ is set to a positive value, e.g. ½. When the average brightness $B_{avg}(p_i)$ is close to the maximum brightness $B_0$, the brightness does not change much (percentage-wise), i.e. $B^*(p_i)/B(p_i)$ is close to 1. Therefore, the brighter image areas are almost unchanged. When the value $B_{avg}(p_i)$ is well below the maximum $B_0$ (i.e. in the dimmer areas), the coefficient $(B_0/B_{avg}(p_i))^\epsilon$ is large, so the image is significantly brightened (highlighted) in these areas. In some embodiments, the local dynamic range is almost unchanged. Indeed, for two pixels $p_i$ and $p_j$, the equation (4B) provides:

$$B^*(p_i)/B^*(p_j) = [B(p_i)/B(p_j)] \times (B_{avg}(p_j)/B_{avg}(p_i))^\epsilon \qquad (4C)$$

If $p_i$ and $p_j$ are near each other, than $B_{avg}(p_i)$ and $B_{avg}(p_j)$ are likely to be close to each other. Hence, the coefficient $(B_{avg}(p_j)/B_{avg}(p_i))^\epsilon$ is small, so the maximum of the values $B(p_i)/B(p_j)$ over a small area will not change much. (The local dynamic range depends of course on how the "small area" is defined. In some embodiments, the area is defined so that the average brightness $B_{avg}$ does not change much in the area, but other definitions are also possible. The invention is not limited to embodiments with small changes of the local dynamic range.)

If it is desirable to reduce the brightness of the brighter areas while leaving the dimmer areas unchanged or almost unchanged, one can select $B_0$ to be the minimum brightness. To reduce the brightness of the dimmer areas while leaving the brighter areas almost unchanged, one can select $B_0$ to be the maximum brightness and $\epsilon$ to be negative. Other options are also possible. In many embodiments, the global dynamic range is increased if $\epsilon$ is positive, and the global dynamic range is decreased if $\epsilon$ is negative. Of note, when $\epsilon$ is negative, equation (4B) can be written as:

$$B^*(p_i) = B(p_i) \times (B_{avg}(p_i)/B_0)^{|\epsilon|} \tag{4D}$$

where $|\epsilon|$ is the absolute value of $\epsilon$.

Color editing (4B)-(4D) can be combined with other types of editing performed in separate steps or simultaneously. For example, highlighting of an image area can be combined with brightening the whole image (multiplying the brightness by a constant k>1) via the following transformation:

$$B^*(p_i) = k \times B(p_i) \times (B_0/B_{avg}(p_i))^{\epsilon} \tag{4E}$$

In some embodiments, the brightness is represented by a value B such that multiplication of B by a positive value k corresponds to the multiplication of all the tristimulus values by k. In some embodiments, the image is a color image. The color coordinate system is chosen so that the brightness B is one of the coordinates, and B can be changed without changing the chromaticity coordinates. For a linear color coordinate system with coordinates $T_1$, $T_2$, $T_3$, the chromaticity coordinates are defined as:

$$T_1/(T_1+T_2+T_3), T_2/(T_1+T_2+T_3), T_3/(T_1+T_2+T_3).$$

In some embodiments, a non-linear color coordinate system is used in the B coordinate is defined by a square root of a quadratic polynomial in tristimulus values, e.g. by a value $B = \sqrt{T_1^2 + T_2^2 + T_3^2}$ where $T_1$, $T_2$, $T_3$ are tristimulus values, or by the value B and the sign of one or more of $T_1$, $T_2$, $T_3$.

In some embodiments, the color coordinate system has the following coordinates:

$$B = \sqrt{T_1^2 + T_2^2 + T_3^2}$$

$$S_2 = T_2/B$$

$$S_3 = T_3/B$$

In this coordinate system, if the B coordinate is changed, e.g. multiplied by some number k, and $S_2$ and $S_3$ are unchanged, the color modification corresponds to multiplying the tristimulus values $T_1$, $T_2$, $T_3$ by k. Therefore, the (B, $S_2$, $S_3$) coordinate system facilitates color editing when it is desired not to change the chromaticity coordinates (so that no color shift would occur). Of note, there is a known color coordinate system xyY which also allows changing only one coordinate Y without changing the chromaticity coordinates. The xyY system is defined from the XYZ coordinates of FIG. 2 as follows:

the Y coordinate of the xyY system is the same as the Y coordinate of the XYZ system;

$$x = X/(X+Y+Z);$$

$$z = Z/(X+Y+Z).$$

In the xyY system, if Y is changed but x and y remain unchanged, then the chromaticity coordinates are unchanged. The xyY system differs from the (B, $S_2$, $S_3$) system in that the Y coordinate is a linear coordinate and is a tristimulus value, while the B coordinate is a non-linear function of tristimulus values (and of the power distribution $P(\lambda)$).

Linear transformations of such color coordinate systems can be used to obtain other novel color coordinate systems.

The invention is not limited to the features and advantages described above. The invention is not limited to editing an image to fit it into a dynamic range of a monitor, a printer, or some other display device. For example, the image editing may be performed to improve the image quality or for any other artistic, esthetic, or other purposes. Other features are described below. The invention is defined by the appended claims.

DESCRIPTION OF SOME EMBODIMENTS

The embodiments described in this section illustrate but do not limit the invention. The invention is defined by the appended claims.

First some suitable color coordinate systems and brightness editing techniques will be described. Dynamic range editing will be described next.

Some embodiments of the present invention use color coordinate systems B$ef$ and BCH which can be defined, for example, as follows. First, a linear color coordinate system DEF is defined as a linear transformation of the 1931 CIE XYZ color coordinate system of FIG. 2:

$$\begin{bmatrix} D \\ E \\ F \end{bmatrix} = A_{XYZ-DEF} \begin{bmatrix} X \\ Y \\ Z \end{bmatrix} \tag{5}$$

where:

$$A_{XYZ-DEF} = \begin{bmatrix} 0.205306 & 0.712507 & 0.467031 \\ 1.853667 & -1.279659 & -0.442859 \\ -0.365451 & 1.011998 & -0.610425 \end{bmatrix} \tag{6}$$

It has been found that for many computations, adequate results are achieved if the elements of matrix $A_{XYZ-DEF}$ are rounded to four digits or fewer after the decimal point, i.e. the matrix elements can be computed with an error $Err \leq 0.00005$. Larger errors can also be tolerated in some embodiments. The DEF coordinate system corresponds to color matching functions $\bar{d}(\lambda)$, $\bar{e}(\lambda)$, $\bar{f}(\lambda)$ which can be obtained from $\bar{x}(\lambda)$, $\bar{y}(\lambda)$, $\bar{z}(\lambda)$ using the same matrix $A_{XYZ\text{-}DEF}$:

$$\begin{bmatrix} \bar{d}(\lambda) \\ \bar{e}(\lambda) \\ \bar{f}(\lambda) \end{bmatrix} = A_{XYZ\text{-}DEF} \begin{bmatrix} \bar{x}(\lambda) \\ \bar{y}(\lambda) \\ \bar{z}(\lambda) \end{bmatrix} \quad (7)$$

By definition of the color matching functions and the tristimulus values, $$D = \int_0^\infty P(\lambda)\bar{d}(\lambda)\,d\lambda \quad (8)$$

$$E = \int_0^\infty P(\lambda)\bar{e}(\lambda)\,d\lambda$$

$$F = \int_0^\infty P(\lambda)\bar{f}(\lambda)\,d\lambda$$

As explained above, the integration can be performed over the visible range only.

As seen in FIG. 2, the color matching functions $\bar{x}(\lambda)$, $\bar{y}(\lambda)$, $\bar{z}(\lambda)$ are never negative. It follows from equations (4) that the X, Y, Z values are never negative. Since the first row of matrix $A_{XYZ\text{-}DEF}$ has only positive coefficients, the function $\bar{d}(\lambda)$ is never negative, and the D value is also never negative.

When D>0 and E=F=0, the color is white or a shade of gray. Such colors coincide, up to a constant multiple, with the CIE $D_{65}$ white color standard.

If a color is produced by a monochromatic radiation with $\lambda$=700 nm (this is a red color), then F=0 and E>0.

The color matching functions $\bar{d}(\lambda)$, $\bar{e}(\lambda)$, $\bar{f}(\lambda)$ form an orthonormal system in the function space $L_2$ on $[0,\infty)$ (or on any interval containing the visible range of the $\lambda$ values if the color matching functions are zero outside of this range), that is:

$$\int_0^\infty \bar{d}(\lambda)\bar{e}(\lambda)\,d\lambda = \int_0^\infty \bar{d}(\lambda)\bar{f}(\lambda)\,d\lambda = \int_0^\infty \bar{e}(\lambda)\bar{f}(\lambda)\,d\lambda = 0 \quad (9)$$

$$\int_0^\infty [\bar{d}(\lambda)]^2\,d\lambda = \int_0^\infty [\bar{e}(\lambda)]^2\,d\lambda = \int_0^\infty [\bar{f}(\lambda)]^2\,d\lambda = K$$

where K is a positive constant defined by the measurement units for the wavelength $\lambda$ and the radiance $P(\lambda)$. The units can be chosen so that K=1.

The integrals in (9) can be replaced with sums if the CMF's are defined at discrete $\lambda$ values, i.e.:

$$\sum_\lambda \bar{d}(\lambda)\bar{e}(\lambda) = \sum_\lambda \bar{d}(\lambda)\bar{f}(\lambda) \quad (10)$$

$$= \sum_\lambda \bar{e}(\lambda)\bar{f}(\lambda)$$

$$= 0$$

-continued $$\sum_\lambda [\bar{d}(\lambda)]^2 = \sum_\lambda [\bar{e}(\lambda)]^2$$

$$= \sum_\lambda [\bar{f}(\lambda)]^2$$

$$= K$$

where the sums are taken over a discrete set of the $\lambda$ values. The constant K can be different than in (9). Color matching functions will be called orthonormal herein if the satisfy the equations (9) or (10).

If S1 and S2 are two colors with DEF coordinates (D1,E1,F1) and (D2,E2,F2), a dot product of these colors can be defined as follows:

$$<S1,S2>=D1*D2+E1*E2+F1*F2 \quad (11)$$

Thus, the DEF coordinate system can be thought of as a Cartesian coordinate system having mutually orthogonal axes D, E, F (FIG. 3), with the same measurement unit for each of these axes.

The dot product (11) does not depend on the color coordinate system as long as the color coordinate system is orthonormal in the sense of equations (9) or (10) and its CMF's are linear combinations of $\bar{x}(\lambda)$, $\bar{y}(\lambda)$, $\bar{z}(\lambda)$ (and hence of $\bar{d}(\lambda)$, $\bar{e}(\lambda)$, $\bar{f}(\lambda)$). More particularly, let $T_1$, $T_2$, $T_3$ be tristimulus values in a color coordinate system whose CMF's $\bar{t}_1$, $\bar{t}_2$, $\bar{t}_3$ belong to a linear span Span($\bar{d}(\lambda)$, $\bar{e}(\lambda)$, $\bar{f}(\lambda)$) and satisfy the conditions (9) or (10). For the case of equations (9), this means that:

$$\int_0^\infty \bar{t}_1(\lambda)\bar{t}_2(\lambda)\,d\lambda = \int_0^\infty \bar{t}_1(\lambda)\bar{t}_3(\lambda)\,d\lambda = \int_0^\infty \bar{t}_2(\lambda)\bar{t}_3(\lambda)\,d\lambda = 0 \quad (12)$$

$$\int_0^\infty [\bar{t}_1(\lambda)]^2\,d\lambda = \int_0^\infty [\bar{t}_2(\lambda)]^2\,d\lambda = \int_0^\infty [\bar{t}_3(\lambda)]^2\,d\lambda = K$$

with the same constant K as in (9). The discrete case (10) is similar. Suppose the colors S1, S2 have the $T_1 T_2 T_3$ coordinates $(T_{1.1}, T_{2.1}, T_{3.1})$ and $(T_{1.2}, T_{2.2}, T_{3.2})$ respectively. Then the dot product (11) is the same as $$<S_1,S_2>=T_{1.1}T_{1.2}+T_{2.1}T_{2.2}+T_{3.1}T_{3.2}.$$

The brightness B of a color S can be represented as the length (the norm) of the vector S:

$$B=\|S\|=\sqrt{<S,S>}=\sqrt{D^2+E^2+F^2} \quad (13)$$

The B$ef$ color coordinate system is defined as follows:

$$B = \sqrt{D^2 + E^2 + F^2} \quad (14)$$

$$e = E/B$$

$$f = F/B$$

If B=0 (absolute black color), then $e$ and $f$ can be left undefined or can be defined in any way, e.g. as zeroes.

Since D is never negative, the D, E, F values can be determined from the B, e, f values as follows:

$$E = e \times B \tag{15}$$

$$F = f \times B$$

$$D = \sqrt{B^2 - (e^*B)^2 - (f^*B)^2} = B\sqrt{1 - e^2 - f^2}$$

The Bef system is convenient for brightness editing because the brightness can be changed by changing the B coordinate and leaving e and f unchanged. Thus, if it is desired to change from some value B to a value k×B for some factor k, the new Bef color coordinates B*, e*, f* can be computed as:

$$B^* = k \times B \tag{16}$$

$$e^* = e$$

$$f^* = f$$

Here k>1 if the brightness is to be increased, and k<1 if the brightness is to be decreased. The transformation (16) corresponds to multiplying the D, E and F values by k:

$$D^* = k \times D$$

$$E^* = k \times E$$

$$F^* = k \times F \tag{17}$$

This transformation in turn corresponds to multiplying the color's radiance $P(\lambda)$ by k (see equations (4)). The radiance multiplication by k is a good model for the intuitive understanding of brightness as a measure of the intensity of the color stimulus. Also, there is no color shift in the transformation (16), i.e. the color's chromatic perception does not change.

The brightness can be changed over the whole image or over a part of the image as desired. The brightness transformation can be performed using computer equipment known in the art. For example, in FIG. 4, a computer processor 410 receives the color coordinates B, e, f (from a memory, a network, or some other source) and also receives the factor k (which can be defined by a user via some input device, e.g. a keyboard or a mouse). The processor outputs the k×B, e, f coordinates. In some embodiments, this color editing is controlled by a user who watches the color on a monitor 420 before and after editing. To display the color on monitor 420, the processor 410 may have to convert the color from the Bef coordinate system to some other coordinate system suitable for the monitor 420, e.g. sRGB or some other system as defined by the monitor specification. The color conversion can be performed by converting the color between Bef and DEF as specified by equations (14) and (15), and between DEF and the XYZ system of FIG. 2 by equations (5) and (6). The color conversion between the XYZ coordinate system and the sRGB can be performed using known techniques.

Figures 3, 4, 5, 6, 7:
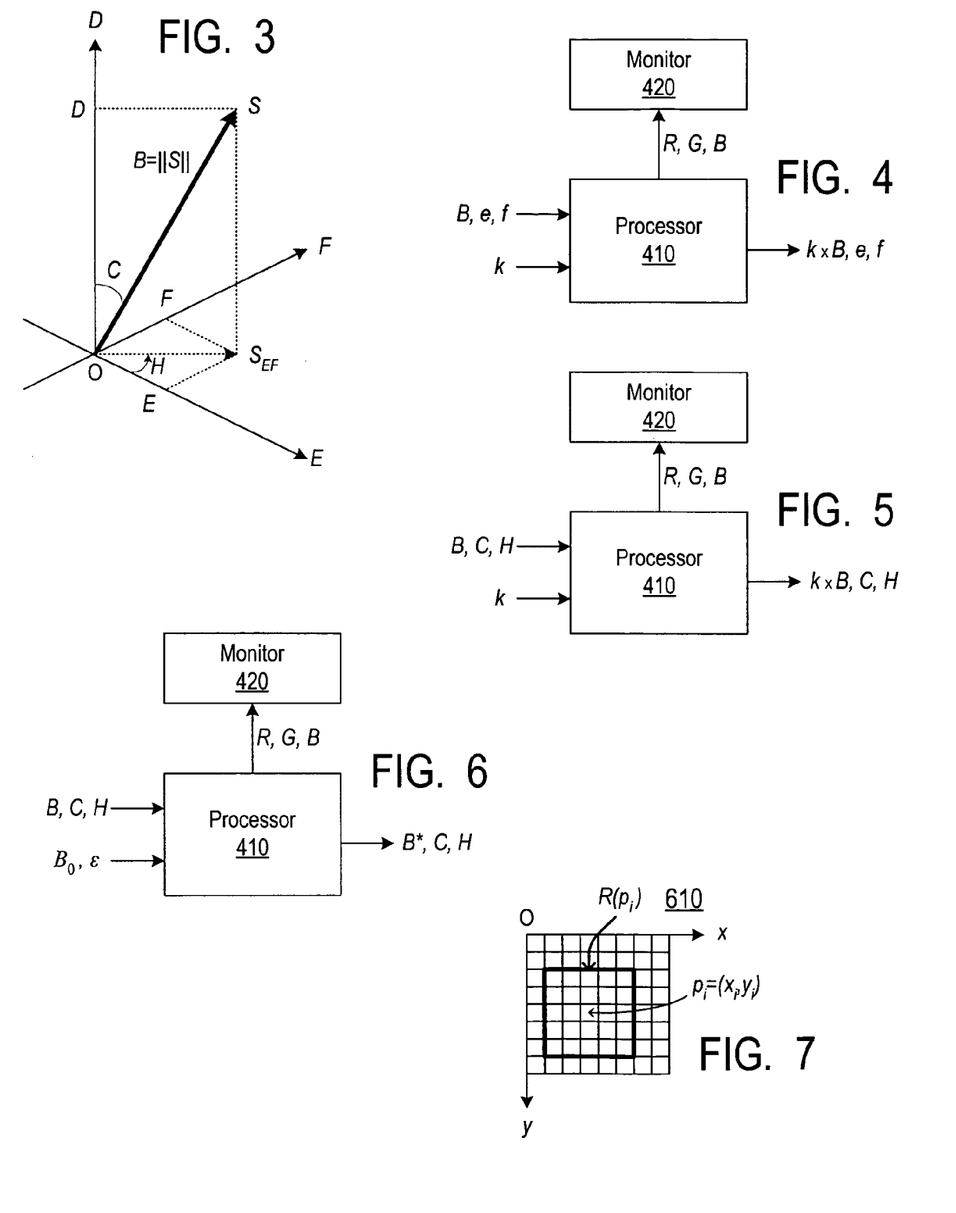
FIG. 3 illustrates some color coordinate systems according to some embodiments of the present invention.
FIGS. 4-6 are block diagrams illustrating color editing according to some embodiments of the present invention.
FIG. 7 illustrates an image edited according to some embodiments of the present invention.

Another color coordinate system that facilitates the brightness editing is the spherical coordinate system for the DEF space. This coordinate system BCH (Brightness, Chroma, Hue) is defined as follows (see also FIG. 3):

$$B = \sqrt{D^2 + E^2 + F^2} \tag{18}$$

C ("chroma") is the angle between the color S and the D axis;

H ("hue") is the angle between (i) the orthogonal projection $S_{EF}$ of the vector S on the EF plane and (ii) the E axis.

The term "chroma" has been used to represent a degree of saturation (see Malacara's book cited above). Recall that in the HSB system, the Saturation coordinate of a color represents the white amount in the color. In the BCH system, the C coordinate of a color is a good representation of saturation (and hence of chroma) because the C coordinate represents how much the color deviates from the white color $D_{65}$ represented by the D axis (E=F=0).

The H coordinate of the BCH system represents the angle between the projection $S_{EF}$ and the red color represented by the E axis, and thus the H coordinate is a good representation of hue.

Transformation from BCH to DEF can be performed as follows:

$$D = B \times \cos C$$

$$E = B \times \sin C \times \cos H$$

$$F = B \times \sin C \times \sin H \tag{19}$$

Transformation from DEF to BCH can be performed as follows. The B coordinate can be computed as in (18). The C and H computations depend on the range of these angles. Any suitable ranges can be chosen. In some embodiments, the angle C is in the range $[0, \pi/2]$, and hence $$C = \cos^{-1}(D/B) \tag{20}$$

In some embodiments, the angle H can be computed from the relationship:

$$\tan H = F/E \tag{21A}$$

or $$\tan H = f/e \tag{21B}$$

where e and f are the Bef coordinates (14). For example, any of the following relations can be used:

$$H = \tan^{-1}(F/E) + \alpha$$

$$H = \tan^{-1}(f/e) + \alpha \tag{22}$$

where $\alpha$ depends on the range of H. In some embodiments, the angle H is measured from the positive direction of the E axis, and is in the range from 0 to $2\pi$ or $-\pi$ to $\pi$. In some embodiments, one of the following computations is used:

$$H = \operatorname{arctg}(E, F)$$

$$H = \operatorname{arctg}(e, f) \tag{23}$$

where arctg is computed as shown in pseudocode in Appendix 1 at the end of this section before the claims.

Transformation from BCH to Bef can be performed as follows:

$$B = B$$

$$e = \sin C \times \cos H$$

$$f = \sin C \times \sin H \tag{24}$$

Transformation from Bef to BCH can be performed as follows:

$$B = B$$

$$C = \cos^{-1}\sqrt{1 - e^2 - f^2}, \text{ or } C = \sin^{-1}\sqrt{e^2 + f^2}$$

$$H = \tan^{-1}(f/e) + \alpha \text{ (see (22)), or } H = \operatorname{arctg}(e, f) \text{ (see Appendix 1).} \tag{25}$$

As with Bef, the BCH system has the property that a change in the B coordinate without changing C and H corresponds to multiplying the tristimulus values D, E, F by some constant k (see equations (17)). The brightness editing is therefore simple to perform. In FIG. 5, the brightness editing is performed like in FIG. 4, with the C and H coordinates used instead of e and $f$.

The B$ef$ and BCH systems are also suitable for changing an image's dynamic range according to equations (4A)-(4E). (Of note, in FIGS. 4 and 5, the dynamic range is unchanged since $B^*_{max}/B^*_{min}=B_{max}/B_{min}$.) In FIG. 6, the brightness is changed as in equation (4B) with the C and H coordinates remaining unchanged. Alternatively, the B$ef$ system can be used, with B edited according to (4B) and with the e and $f$ coordinates unchanged. For the sake of illustration, suppose the image consists of a two-dimensional set of pixels $p_i$ (i=1, 2, . . . ) with coordinates $(x_i, y_i)$, as shown in FIG. 7 for an image 610. Let $B(p_i)$ denote the brightness value (the B coordinate) at the pixel $p_i$, and $B^*(p_i)$ denote the modified brightness. $B_{avg}(p_i)$ may be some average brightness value, for example, the mean of the brightness values in some region $R(p_i)$ containing the pixel $p_i$:

$$B_{avg}(p_i) = \frac{1}{N(p_i)} \sum_{p \in R(p_i)} B(p) \quad (26)$$

where $N(p_i)$ is the number of the pixels in the region $R(p_i)$. In equation (4B):

$B_0$ is some pre-defined brightness level;

$B_{avg}(p_i)$ is some average brightness value, e.g. the mean brightness over a region $R(p_i)$ containing the pixel $p_i$ as in (26), or a weighted average as described below in connection with equation (33);

$\epsilon$ is a pre-defined constant. If it is desired to increase the brightness at the pixels $p_i$ at which $B_{avg}(p_i)<B_0$, then $\epsilon$ is positive (in some embodiments, $\epsilon$ is in the interval (0,1)). Good results can be achieved for $B_0$ being the maximum brightness and $0<\epsilon \leq \frac{1}{2}$. If it is desired to reduce the brightness (e.g. to deepen the shadow) at the pixels $p_i$ at which $B_{avg}(p_i)<B_0$, then $\epsilon$ is negative (e.g. in the interval (-1,0)).

In FIG. 7, the region $R(p_i)$ is a square centered at the pixel $p_i$ and having a side of 5 pixels long (the length measured in pixels can be different along the x and y axes if a different pixel density is present at the two axes). In some embodiments, the region $R(p_i)$ is a non-square rectangle centered at $p_i$, or a circle or an ellipse centered at $p_i$. In some embodiments, the regions $R(p_i)$ have the same size and the same geometry for different pixels $p_i$, except possibly at the image boundary. The region $R(p_i)$ does not have to be symmetric or centered at $p_i$.

Figure 8:
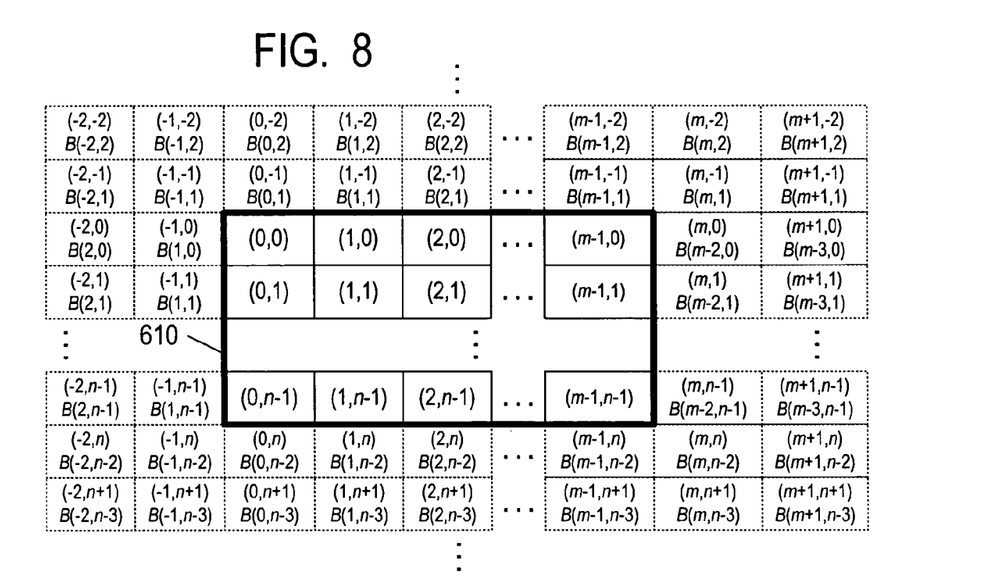
FIG. 8 illustrates an image extension at the image boundaries for dynamic range editing according to some embodiments of the present invention.

In some embodiments, the regions $R(p_i)$ corresponding to pixels $p_i$ at the image boundary have fewer pixels than the regions corresponding to inner pixels $p_i$. In other embodiments, the image is extended (or just the brightness values are extended) to allow the regions $R(p_i)$ to have the same size for all the pixels $p_i$. Different extensions are possible, and one extension is shown in FIG. 8 for the square regions $R(p_i)$ of FIG. 7. The image 610 has n rows (y=0, . . . , n-1) and m columns (x=0, . . . , m-1). The image is extended as follows. First, in each row y, the brightness values are extended by two pixels to the left (x=-1, -2) and two pixels to the right (x=m, m+1). The brightness values are extended by reflection around the original image boundaries, i.e. around the columns x=0 and x=m-1. For example, B(-1,0)=B(1,0), B(m,0)=B(m-2,0), and so on. Then in each column (including the extension columns x=-2, -1, m, m+1), the brightness values are extended by two pixels up and two pixels down using reflection. FIG. 8 shows the pixel's coordinates for each pixel and the brightness value for each extension pixel.

Efficient algorithms exist for calculating the mean values $B_{avg}(p_i)$ for a plurality of adjacent pixels $p_i$ for rectangular regions $R(p_i)$. One such algorithm is illustrated in pseudocode in Appendix 2 at the end of this section.

In some embodiments, the regions $R(p_i)$ are chosen such that the brightness does not change much in each region (e.g. such that the region does not cross a boundary at which the derivative of the brightness changes by more than a pre-defined value).

Figure 9:
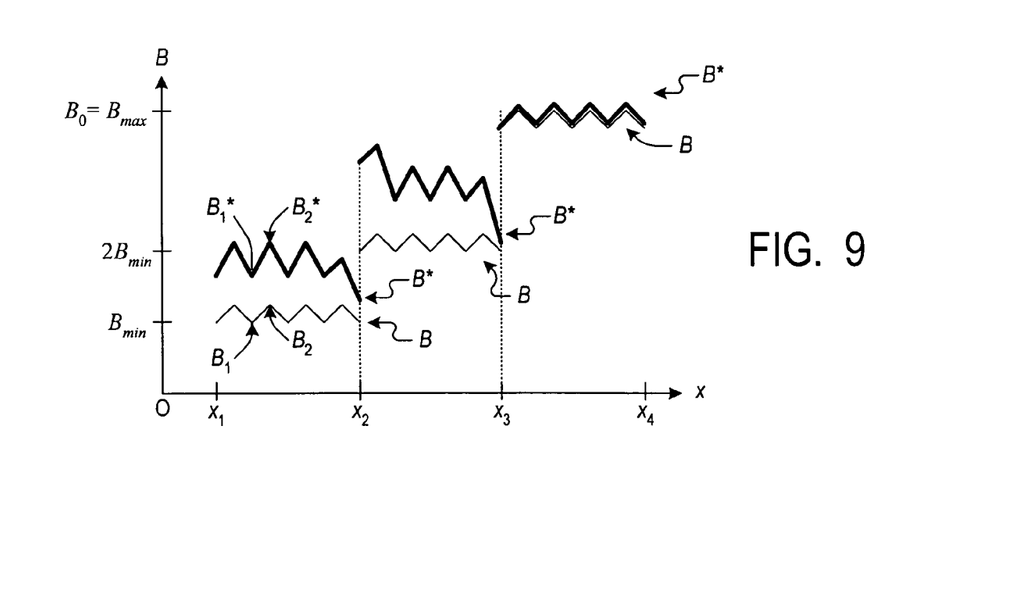
FIGS. 9-11 are brightness graphs illustrating image editing according to some embodiments of the present invention.

FIG. 9 illustrates the brightness values B and $B^*$ along an axis x assuming a one-dimensional image. For simplicity, the brightness is shown as if changing continuously, i.e. the pixels are assumed to be small. The original brightness $B(x)=B(p_i)$ is shown by thin lines, and the modified brightness $B^*$ by thick lines. The value $B_0$ is chosen to equal $B_{max}$ (the maximum brightness over the image), and $\epsilon$ is about $\frac{1}{2}$. In this example, the minimum brightness value $B_{min}=B_{max}/4$. $B_{avg}(x)$ is the mean brightness in some neighborhood $R(x)$ of the point x.

The original brightness B has large jumps at points $x=x_2$ and $x=x_3$. It is assumed that R(x) is small relative to the values $x_2-x_1$, $x_3-x_2$, and $x_4-x_3$. When x is between $x_1$ and $x_2$, the original brightness B is near $B_{min}$, i.e. about $B_0/4$. The value $B_{avg}$ is also near $B_0/4$, so $B^*$ is about 2B. The difference $(B_2^*-B_1^*)$ is about double the difference $(B_2-B_1)$ between the original brightness values. Therefore, the image details become more visible in the dimmest area.

When $x_2<x<x_3$, the original brightness B is near the value $2B_{min}=B_0/2$. As x approaches $x_2$ from the left, the brightness average $B_{avg}$ increases due to contribution of the pixels to the right of $x_2$, so the ratio $B^*/B$ tends to decrease. When x increases past $x_2$, this ratio further decreases. When $x>x_3$, the original brightness B is close to the maximum value $B_0$, so the modified brightness $B^*$ is close to the original brightness. Therefore, the brightest area is almost unchanged.

The coefficient $(B_0/B_{avg}(p_i))^\epsilon$ in (4B) is a function of $B_{avg}$, so this coefficient changes smoothly over the image. As a result, the visual effect is highlighting of the entire dimmer areas rather than just individual dim pixels (a generally dim area may include individual bright pixels). The local dynamic range therefore does not change much. The smoothness degree can be varied by varying the size of the region $R(p_i)$ over which the average $B_{avg}$ is computed.

Figure 10:
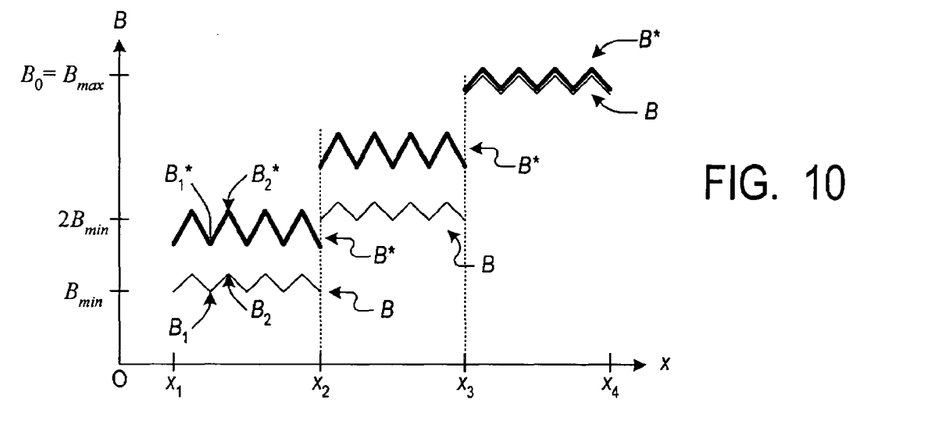

In FIG. 10, the regions $R(p_i)$ are chosen not to cross the boundaries $x=x_1$, $x=x_2$, $x=x_3$, $x=x_4$. Therefore, when x approaches $x_2$ from the left, the brightness average $B_{avg}(x)$ is not affected by the brightness values to the right of $x_2$, so the ratio $B^*/B$ does, not change much. More generally, this ratio does not change much in each of the intervals $(x_1,x_2)$, $(x_2,x_3)$, $(x_3,x_4)$.

Figure 11:
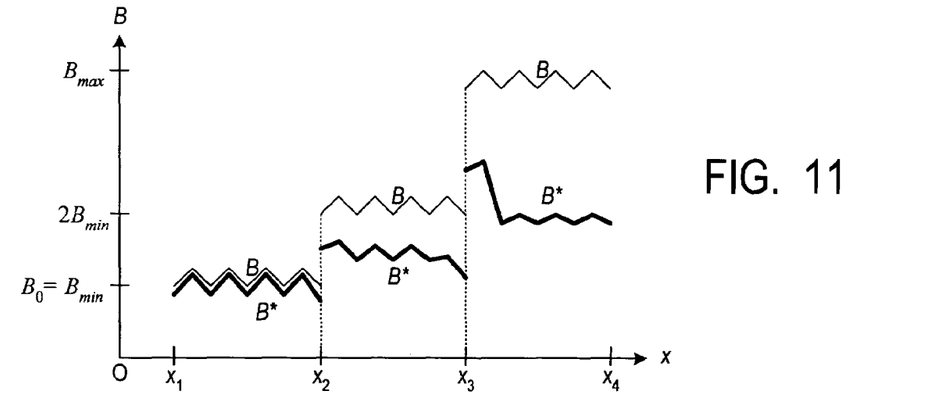

In FIG. 11, $B_0$ is set to the minimum brightness value $B_{min}$. This type of editing is useful when the monitor displays the dimmest areas adequately but the brightest areas are out of the monitor's dynamic range. The transformation (4B) can be used with a positive $\epsilon$, e.g. $\epsilon=\frac{1}{2}$. The brightness is reduced in image areas in which $B_{avg}>B_0$. The brightness is reduced more in the brighter areas, less in the dimmer areas. The regions $R(p_i)$ are as in FIG. 9, but they could be chosen as in FIG. 10 or in some other manner.

Figure 12:
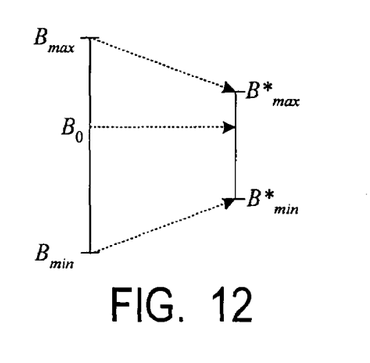
FIGS. 12, 13 illustrate image values transformed via image editing according to some embodiments of the present invention.

FIG. 12 illustrates how the values $B_0$ and $\epsilon$ can be chosen in some embodiments. Suppose an image editing system (e.g. a computer) is provided with a maximum brightness $B_{max}$ and a minimum brightness $B_{min}$. These can be, for example, the minimum and maximum brightness of the original image or image portion, or the minimum and maximum brightness to be edited, or the minimum and maximum brightness of a system which created the original image. The image editing system is also provided with a target maximum brightness $B^*_{max}$ and a target minimum brightness $B^*_{min}$. Substituting the values $B_{max}$, $B_{min}$, $B^*_{max}$, $B^*_{min}$ into (4B), and assuming for simplicity that $B_{avg}(p_i)=B(p_i)$ when $B(p_i)$ is equal to $B_{min}$ or $B_{max}$, we obtain:

$$B^*_{max}=B_{max}\times(B_0/B_{max})^\epsilon \quad (27A)$$

$$B^*_{min}=B_{min}\times(B_0/B_{min})^\epsilon \quad (27B)$$

These two equations can be solved for $B_0$ and $\epsilon$. (For example, the equation (27A) can be divided by (27B) to eliminate $B_0$ and solve for $\epsilon$, and then the $\epsilon$ solution can be substituted into (27A) or (27B) to find $B_0$.) The solution is:

$$\varepsilon = \frac{\log DR - \log DR^*}{\log DR} \quad (28A)$$

$$B_0 = B_{\max}^{1-\frac{1}{\varepsilon}} \cdot (B_{\max}^*)^{\frac{1}{\varepsilon}} \quad (28B)$$

Here $DR=B_{max}/B_{min}$, and $DR^*=B^*_{max}/B^*_{min}$. The logarithm can be to any base.

Figure 13:
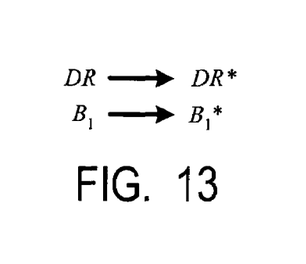

In FIG. 13, the image editing system is provided a starting dynamic range DR and a target dynamic range DR*. It is desired to obtain the values $B_0$ and $\epsilon$ so as to convert some predefined brightness value $B_1$ to a predefined brightness value $B_1^*$. Using the equations (27A), (27B), we obtain the value $\epsilon$ as in (28A). Substituting $B_1$ and $B_1^*$ into (4B), and assuming for simplicity that $B_{avg}(p_i)=B(p_i)$ when $B(p_i)$ is equal to $B_1$, we obtain:

$$B^*_1=B_1\times(B_0/B_1)^\epsilon \quad (29)$$

Using the expression (28A) for $\epsilon$, we obtain:

$$B_0=B_1^{1-1/\epsilon}\cdot(B_1^*)^{1/\epsilon} \quad (30)$$

In (4B), the value $B_0$ can be any value, not necessarily the minimum or maximum brightness. The brightness values below $B_0$ are modified as in FIG. 9 in some embodiments, and the brightness values above $B_0$ as in FIG. 11. In some embodiments, $B_0$ is chosen as the best brightness value for a given display device, i.e. the value at which (or near which) the display device provides the best image quality. The transformation (4B) with $\epsilon>0$ tends to squeeze the brightness values closer to $B_0$. When $\epsilon<0$, the transformation (4B) tends to spread the brightness values wider above and/or below $B_0$.

Some embodiments use equations other than (4B). Note equation (4A). In some embodiments, $$B^*(p_i)=B(p_i)\times f(B_{avg}(p_i)) \quad (31)$$

where $f(y)$ is a non-negative function strictly monotonic in y. In some embodiments, $$B^*(p_i)=f(B(p_i),B_{avg}(p_i)) \quad (32)$$

where $f(x,y)$ is a non-negative function which is strictly monotonic in y for each fixed $x=B(p_i)$. In some embodiments, the function is chosen to be strictly decreasing in y. Hence, as $B_{avg}$ increases, the modified brightness B* decreases for a given original brightness value B. In other embodiments, the function is chosen to be strictly increasing in y for each fixed x. In some embodiments, $f(x,y)$ is strictly increasing in x for each fixed y. In some embodiments, $f(x, B_0)=x$ for all x for a predefined value $B_0$. Hence, if the image contains pixels with an average brightness $B_{avg}=B_0$, their brightness is unchanged. In some embodiments, $f(x,B_0)=k\times x$ where k is a predefined constant, i.e. the brightness is multiplied by the predefined constant whenever $B_{avg}=B_0$. The transformation (32) can be applied to an entire image (e.g. a rectangular array of pixels) or a part of the image.

In some embodiments, $B_{avg}$ is a weighted average:

$$B_{avg}(p_i) = \frac{1}{N(p_i)} \sum_{p \in R(p_i)} w(p, p_i)B(p) \quad (33)$$

where $w(p,p_i)$ are some weights. In some embodiments, each value $w(p,p_i)$ is completely defined by $(x-x_i,y-y_i)$ where (x,y) are the coordinates of the pixel p and $(x_i,y_i)$ are the coordinates of the pixel $p_i$. In some embodiments, all the weights are positive. In some embodiments, the sum of the weights is 1. The sum of the weights can also differ from 1 to obtain a brightness shift. The brightness shift and the dynamic range change can thus be performed at the same time, with less computation than would be needed to perform the two operations separately.

The editing can also be performed on monochromatic images. These images are formed with a single color of possibly varying intensity. In such images, the brightness B represents the color's intensity. In some embodiments, the brightness B is the only color coordinate.

The invention is not limited to the Be$f$ and BCH coordinate systems, or the brightness values given by equation (13). In some embodiments, the brightness B is defined in some other way such that multiplication of the brightness by a value k in some range of positive values corresponds to multiplication of all the tristimulus values by the same value. In some embodiments, the chromaticity coordinates remain unchanged. For example, the brightness can be defined by the equation (39) discussed below.

The invention includes systems and methods for color image editing and display. The color coordinates can be transmitted in a data carrier such as a wireless or wired network link, a computer readable disk, or other types of computer readable media. The invention includes computer instructions that program a computer system to perform the brightness editing and color coordinate system conversions. Some embodiments of the invention use hardwired circuitry instead of, or together with, software programmable circuitry.

In some embodiments, the color coordinate system can be replaced with their linear transforms, e.g. the coordinates (B+e,e,$f$) or (2B,2e,2$f$) can be used instead of (B, e,$f$). The angle H can be measured from the E axis or some other position. The angle C can also be measured from some other position. The invention is not limited to the order of the coordinates. The invention is not limited to DEF, XYZ, or any other color coordinate system as the initial coordinate system. In some embodiments, the orthonormality conditions (9) or (10) are replaced with quasi-orthonormality conditions, i.e. the equations (9) or (10) hold only approximately. More particularly, CMF's $\bar{t}_1(\lambda), \bar{t}_2(\lambda), \bar{t}_3(\lambda)$ will be called herein quasi-orthonormal with an error at most $\epsilon$ if they satisfy the following conditions:

1. each of $$\int_0^\infty \bar{t}_1(\lambda)\bar{t}_2(\lambda)d\lambda, \quad \int_0^\infty \bar{t}_1(\lambda)\bar{t}_3(\lambda)d\lambda, \quad \int_0^\infty \bar{t}_2(\lambda)\bar{t}_3(\lambda)d\lambda$$

is in the interval $[-\epsilon,\epsilon]$, and 2. each of $$\int_0^\infty [\bar{t}_1(\lambda)]^2 d\lambda, \quad \int_0^\infty [\bar{t}_2(\lambda)]^2 d\lambda, \quad \int_0^\infty [\bar{t}_3(\lambda)]^2 d\lambda$$

is in the interval $[K-\epsilon, K+\epsilon]$ for positive constants K and $\epsilon$. In some embodiments, $\epsilon$ is 0.3K, or 0.1K, or some other value at most 0.3K, or some other value. Alternatively, the CMF's will be called quasi-orthonormal with an error at most $\epsilon$ if they satisfy the following conditions:

1 each of $$\sum_\lambda \bar{t}_1(\lambda)\bar{t}_2(\lambda), \sum_\lambda \bar{t}_1(\lambda)\bar{t}_3(\lambda), \sum_\lambda \bar{t}_2(\lambda)\bar{t}_3(\lambda)$$

is in the interval $[-\epsilon,\epsilon]$, and 2. each of $$\sum_\lambda [\bar{t}_1(\lambda)]^2, \sum_\lambda [\bar{t}_2(\lambda)]^2, \sum_\lambda [\bar{t}_3(\lambda)]^2$$

is in the interval $[K-\epsilon, K+\epsilon]$ for positive constants $K$ and $\epsilon$. In some embodiments, $\epsilon$ is 0.3K, or 0.1K, or some other value at most 0.3K, or some other value. Orthonormal functions are quasi-orthonormal, but the reverse is not always true. If $\epsilon=0.1K$, the functions will be called 90%-orthonormal. More generally, the functions will be called n %-orthonormal if $\epsilon$ is (100-n) % of K. For example, for 70%-orthonormality, $\epsilon=0.3K$.

The invention is not limited to the orthonormal or quasi-orthonormal CMF's or to any particular white color representation. For example, in some embodiments, the following color coordinate system $(S_1, S_2, S_3)$ is used for color editing:

$$S_1 = \sqrt{X^2 + Y^2 + Z^2}$$

$$S_2 = X/S_1$$

$$S_3 = Z/S_1 \quad (34)$$

The XYZ tristimulus values in (34) can be replaced with linear RGB tristimulus values or with some other tristimulus values $T_1, T_2, T_3$, e.g.:

$$S_1 = \sqrt{T_1^2 + T_2^2 + T_3^2}$$

$$S_2 = T_2/S_1$$

$$S_3 = T_3/S_1. \quad (35)$$

If $T_1$ can be negative, than the sign of $T_1$ can be provided in addition to the coordinates. Alternatively the sign of $T_1$ can be incorporated into one of the $S_1$, $S_2$, and/or $S_3$ values, for example:

$$S_1 = \text{Sign}(T_1) \times \sqrt{T_1^2 + T_2^2 + T_3^2} \quad (36)$$

The brightness editing can still be performed by multiplying the $S_1$ coordinate by k, with the $S_2$ and $S_3$ values being unchanged.

The BCH coordinate system can be constructed from linear systems other than DEF, including orthonormal and non-orthonormal, normalized and non-normalized systems. In some embodiments, a coordinate system is used with coordinates $(S_1, S_2, S_3)$, where $S_1$ is defined as in (35) or (36), and the coordinates $S_2$ and $S_3$ are defined in a way similar to (20)-(23), e.g.:

$$S_2 = \cos^{-1}(T_1/B)$$

$$S_3 = \tan^{-1}(T_3/T_2) + \alpha \quad (37)$$

where $\alpha$ is as in (22), or $$S_3 = \text{arctg}(T_2, T_3) \quad (38)$$

In some embodiments, the value B is the square root of some other quadratic polynomial of in $T_1$, $T_2$, $T_3$:

$$B = \sqrt{g_{11}T_1^2 + g_{22}T_2^2 + g_{33}T_3^2 + g_{12}T_1T_2 + g_{13}T_1T_3 + g_{23}T_2T_3} \quad (39)$$

wherein $g_{11}$, $g_{22}$, $g_{33}$, $g_{12}$, $g_{13}$, $g_{23}$ are predefined constants, and $g_{11}$, $g_{22}$, $g_{33}$ are not equal to zero (e.g. $g_{11}$, $g_{22}$, $g_{33}$ are positive). Linear transforms result in different mathematical expressions of the coordinates without necessarily changing the values of the coordinates. For example, the coordinate system may use coordinates $S_1$, $S_2$, $S_3$ or their linear transform, wherein $S_1$ is defined by the value B, or $S_1$ is defined by B and the sign of a predefined function of one or more of $T_1$, $T_2$, $T_3$. In some embodiments $$B = \sqrt{\alpha_1^2(T_1,T_2,T_3) + \alpha_2^2(T_1,T_2,T_3) + \alpha_3^2(T_1,T_2,T_3)}$$

wherein $$\alpha_1(T_1,T_2,T_3) = \alpha_{11} \times T_1 + \alpha_{12} \times T_2 + \alpha_{13} \times T_3$$

$$\alpha_2(T_1,T_2,T_3) = \alpha_{21} \times T_1 + \alpha_{22} \times T_2 + \alpha_{23} \times T_3$$

$$\alpha_3(T_1,T_2,T_3) = \alpha_{31} \times T_1 + \alpha_{32} \times T_2 + \alpha_{33} \times T_3$$

wherein $\alpha_{11}$, $\alpha_{12}$, $\alpha_{13}$, $\alpha_{21}$, $\alpha_{22}$, $\alpha_{23}$, $\alpha_{31}$, $\alpha_{32}$, $\alpha_{33}$ are predefined numbers such that the following matrix $\Lambda$ is non-degenerate:

$$\Lambda = \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix}$$

In some embodiments, the coordinate $S_1$ is defined by the value B and by a sign of a predefined function of one or more of $T_1$, $T_2$, $T_3$. The function can be one of $\alpha_1(T_1,T_2,T_3)$, $\alpha_2(T_1,T_2,T_3)$, $\alpha_3(T_1,T_2,T_3)$. Clearly, the values $T_1' = \alpha_1(T_1,T_2,T_3)$, $T_2' = \alpha_2(T_1,T_2,T_3)$, $T_3' = \alpha_3(T_1,T_2,T_3)$ are also tristimulus values. In some embodiments, the coordinate $S_2$ is defined by a value $\beta(T_1,T_2,T_3)/B$, wherein $$\beta(T_1,T_2,T_3) = \beta_1 \times T_1 + \beta_2 \times T_2 + \beta_3 \times T_3,$$

wherein $\beta_1$, $\beta_2$, $\beta_3$ are predefined numbers at least one of which is not equal to zero, or the coordinate $S_2$ is defined by the value $\beta(T_1,T_2,T_3)/B$ and the sign of a predefined function of one or more of $T_1$, $T_2$, $T_3$. The coordinate $S_3$ is defined by a value $\gamma(T_1,T_2,T_3)/B$, wherein $$\gamma(T_1,T_2,T_3) = \gamma_1 \times T_1 + \gamma_2 \times T_2 + \gamma_3 \times T_3,$$

wherein $\gamma_1$, $\gamma_2$, $\gamma_3$ are predefined numbers at least one of which is not equal to zero, and $\gamma(T_1,T_2,T_3)$ is not a multiple of $\beta(T_1,T_2,T_3)$, or the coordinate $S_3$ is defined by the value $\gamma(T_1,T_2,T_3)/B$ and the sign of a predefined function of one or more of $T_1$, $T_2$, $T_3$. In some embodiments, a value $\cos S_2$ is defined by a value $\beta(T_1,T_2,T_3)/B$, wherein $$\beta(T_1,T_2,T_3) = \beta_1 \times T_1 + \beta_2 \times T_2 + \beta_3 \times T_3,$$

wherein $\beta_1$, $\beta_2$, $\beta_3$ are predefined numbers at least one of which is not equal to zero, or the value $\cos S_2$ is defined by the value $\beta(T_1,T_2,T_3)/B$ and the sign of a predefined function of one or more of $T_1$, $T_2$, $T_3$. In some embodiments, a value $\tan S_3$ is defined by a value $\gamma(T_1,T_2,T_3)/\delta(T_1,T_2,T_3)$, wherein $$\gamma(T_1,T_2,T_3)=\gamma_1 \times T_1 + \gamma_2 \times T_2 + \gamma_3 \times T_3,$$

$$\delta(T_1,T_2,T_3)=\delta_1 \times T_1 + \delta_2 \times T_2 + \delta_3 \times T_3,$$

wherein $\gamma_1$, $\gamma_2$, $\gamma_3$ are predefined numbers at least one of which is not equal to zero, and $\delta_1$, $\delta_2$, $\delta_3$ are predefined numbers at least one of which is not equal to zero, or the value $\tan S_3$ is defined by the value $\gamma(T_1,T_2,T_3)/\delta(T_1,T_2,T_3)$ and the sign of a predefined function of one or more of $T_1$, $T_2$, $T_3$. In some embodiments, $\beta(T_1,T_2,T_3)$ is one of $\alpha_1(T_1,T_2,T_3)$, $\alpha_2(T_1,T_2,T_3)$, $\alpha_3(T_1,T_2,T_3)$; $\gamma(T_1,T_2,T_3)$ is another one of $\alpha_1(T_1,T_2,T_3)$, $\alpha_2(T_1,T_2,T_3)$, $\alpha_3(T_1,T_2,T_3)$; and $\delta(T_1,T_2,T_3)$ is the third one of $\alpha_1(T_1,T_2,T_3)$, $\alpha_2(T_1,T_2,T_3)$, $\alpha_3(T_1,T_2,T_3)$. In some embodiments, any color whose tristimulus values $T_1, T_2, T_3$ are such that $\alpha_1(T_1, T_2, T_3)$ is not zero and $\alpha_2(T_1,T_2,T_3)=\alpha_3(T_1,T_2,T_3)=0$, is a white or a shade of gray. This can be $D_{65}$ or some other white color. In some embodiments, a monochromatic red color of a predefined wavelength has tristimulus values $T_1$, $T_2$, $T_3$ such that $\alpha_2(T_1,T_2,T_3)$ is positive and $\alpha_3(T_1,T_2,T_3)=0$. In some embodiments, $\alpha_1(T_1,T_2,T_3)$, $\alpha_2(T_1,T_2,T_3)$, $\alpha_3(T_1,T_2,T_3)$ are tristimulus values corresponding to 70%-orthonormal color matching functions. In some embodiments, up to a constant multiple, $\Lambda$ is an orthonormal matrix, i.e. $\Lambda\Lambda^T=1$, where $\Lambda^T$ is a transpose of $\Lambda$, and 1 is the identity matrix, i.e.

$$I = \begin{bmatrix} 1 & 0 & 0 \\ 0 & 1 & 0 \\ 0 & 0 & 1 \end{bmatrix}$$

We will also call the matrix orthonormal if $\Lambda\Lambda^T=c \times I$ where c is a non-zero number. If the elements of $\Lambda\Lambda^T$ are each within $c \times n/100$ of the respective elements of a matrix $c \times I$ for some c and n, then the matrix $\Lambda$ will be called (100−n) %-orthonormal. For example, if the elements of $\Lambda\Lambda^T$ are each within $0.3 \times c$ of the respective elements of a matrix $c \times I$ (i.e. for each element $\lambda_{i,j}$ of matrix $\Lambda\Lambda^T$, $|\lambda_{i,j}-e_{i,j}| \leq 0.3 \times c$ where $e_{i,j}$ is the corresponding element of the matrix $c \times I$), the matrix $\Lambda$ will be called 70%-orthonormal. In some embodiments, the matrix $\Lambda$ is 70% or more percent orthonormal (e.g. 90%-orthonormal).

The tristimulus values $T_1$, $T_2$, $T_3$, or the corresponding color matching functions, do not have to be normalized in any way. In some prior art systems, the color matching functions are normalized to require that the integral of each color matching function be equal to 1. In the XYZ system of FIG. 2, there is a normalizing condition X=Y=Z for a pre-defined, standard white color with a constant spectral power distribution function $P(\lambda)$. The invention is not limited by any such requirements.

The invention is not limited to the two-dimensional images (as in FIG. 6). The invention is applicable to pixel (bitmap) images and to vector graphics. Colors can be specified separately for each pixel, or a color can be specified for an entire object or some other image portion. The invention is not limited to a particular way to specify the brightness transformation or any other transformations. For example, the brightness transformation can be specified by a value to be added to the brightness (B*=B+k) or in some other way. Other embodiments and variations are within the scope of the invention, as defined by the appended claims.

---

APPENDIX 1-FUNCTION arctg(a, b)

Here is a pseudocode written in a C-like language (C is a programming language).

```
inline float arctg(const float a, const float b)
{
    float res;
    if( FLT_EPSILON * abs(b) < abs(a) )
            //FLT_EPSILON is the minimum positive number ε
            // such that 1−ε is different from 1 on the computer.
            //abs( ) is the absolute value
    {
        res = tan⁻¹ (b / a) ;
        if (a < 0)
        {
            res += π ;
        }
        else if (b < 0)
        {
            res += 2 π ;
        };
    }
    else
    {
        if(b < 0)
        {
            res = {3/2} π ;
        }
        else
        {
            if (b > 0)
            {
                res = {1/2} π ;
            }
            else
            {
                res = 0 ;
            };
        };
    };
    return res ;
};
```

---

APPENDIX 2-Calculation of Means $B_{avg}(p_i)$ for rectangular regions $R(p_i)$

```
void CalculatePartialSum(
    float   *pB,         //InOut
    int     nLenght,     //In
    int     nRadius      //In
)
{
    float *Temp = new float [nLenght + 2 * nRadius] ;
    int offset = nRadius ;
    for (int i = 0; i < nLenght; ++i)
    {
        Temp[offset++] = pB[i] ;
    } ;
    int iLeft = nRadius ;
    int iRight = nLenght −2 ;
    for (i = 0; i < nRadius; ++i)
    {
        Temp[i] = pB[iLeft−−] ;
        Temp[offset++] = pB[iRight−−] ;
    } ;
    iLeft = 0;
    iRight = 2 * nRadius +1;
    float Sum = Temp[0] ;
    for (i = 1; i < iRight; ++i)
    {
        Sum += Temp[i] ;
    } ;
    pB[0] = Sum;
    for (i = 1; i < nLenght; ++i)
    {
        Sum += Temp[iRight ++]− Temp[iLeft++] ;
        pB[i]= Sum;
```

-continued

APPENDIX 2-Calculation of Means $B_{avg}(p_i)$ for rectangular regions $R(p_i)$

```
        }
        return;
};
void CalculateMeanBrightness(
        float       *pMeanB,            //Out
        image       *pImage,            //In
        int         nWidth,             //In
        int         nHeight,            //In
        int         nRadiusWidth,       //In
        int         nRadiusHeight       //In
)
{
        int length = nWidth * nHeight ;
        for(int offset = 0; offset < length; ++offset)
        {
                pMeanB[offset] = Brightness(pImage[offset]) ;
        } ;
        offset = 0;
        for(int y = 0; y < nHeight; ++y)
        {
                CalculatePartialSum( pMeanB+offset, nWidth, nRadiusWidth ) ;
                offset += nWidth ;
        } ;
        float *Temp = new float[nHeight] ;
        float kNorm = 1. / (2 * nRadiusWidth + 1) /
        (2 * nRadiusHeight + 1) ;
        for(int x = 0; x < nWidth; ++x)
        {
                offset = x ;
                for(int y = 0; y < nHeight; ++y)
                {
                        Temp[y] = pMeanB[offset] ;
                        offset += nWidth ;
                } ;
                CalculatePartial Sum( Temp, nHeight, nRadiusHeight ) ;
                offset = x ;
                for(y = 0; y < nHeight; ++y)
                {
                        pMeanB[offset] = Temp[y] * kNorm ;
                        offset += nWidth ;
                } ;
        } ;
        return ;
} ;
```

The invention claimed is:

1. A circuitry-implemented method comprising image editing, the method comprising:
   (1) obtaining digital data representing image portions $p_1$, $p_2$, ..., wherein for each image portion p ($p=p_1, p_2, ...$), the digital data define a brightness B(p) of the portion p;
   (2) for each image portion $p_i$ of a plurality of the image portions $p_1, p_2, ...$, obtaining a brightness $B^*(p_i)$ of a modified image, such that:

$$B^*(p_i)=f(B(p_i),B_{avg}(p_i))$$

wherein:
   $B_{avg}(p_i)$ is a function of the brightness values B(v) of image portions p in an image region $R(p_i)$ containing a plurality of image portions including the portion $p_i$; and
   $f$ is a predefined non-identity function such that for all i, the function $f(B(p_i),y)$ is strictly monotonic my for each $B(p_i)$, and for each $B_{avg}(p_i)$, the function $f(x,B_{avg}(p_i))$ is strictly increasing in x.

2. The method of claim 1 wherein for all i, the function $f(B(p_i),y)$ is strictly decreasing in y for each $B(p_i)$.

3. The method of claim 1 wherein for all i, the function $f(B(p_i),y)$ is strictly increasing in y for each $B(p_i)$.

4. The method of claim 1 wherein for all i, $$f(x,B_{avg}(p_i))=x \cdot F(B_{avg})$$

for some function F.

5. The method of claim 4 wherein there exists a positive value $B_0$ such that $F(B_0)=1$.

6. The method of claim 5 wherein $B_{min} \leq B_0 \leq B_{max}$, wherein $B_{min}$ is the minimum of the brightness values $B(p_i)$ and $B_{max}$ is the maximum of the brightness values $B(p_i)$.

7. The method of claim 5 wherein:

$$B^*(p_i)=B(p_i) \times (B_0/B_{avg}(p_i))^\epsilon$$

where $\epsilon$ is a non-zero constant.

8. The method of claim 7 wherein c is greater than −1 and less than 1.

9. Circuitry for performing the method of claim 7.

10. One or more computer-readable mediums comprising one or more computer instructions to cause a computer system to perform the method of claim 7.

11. The method of claim 1 wherein the operation (2) is performed for a plurality of portions pt with each image region $R(p_i)$ having a predefined geometry with respect to the respective portion $p_i$.

12. The method of claim 1 wherein $B_{avg}(p_i)$ is a weighted average of the brightness values of the image region $R(p_i)$, and the sum of the weights is equal to 1.

13. The method of claim 1 wherein $B_{avg}$ is the mean of the brightness values in the image region $R(p_i)$.

14. The method of claim 1 wherein for each image portion p ($p=p_1, p_2, ...$), the digital data represent a color S(p) of the portion p, the color S(p) having tristimulus values $T_1(p)$, $T_2(p)$, $T_3(p)$ in a predefined color coordinate system, wherein for any color S having tristimulus values $T_1, T_2, T_3$ in said predefined color coordinate system and having a brightness B, for any positive value k in a range of positive values, a color with tristimulus values $kT_1, kT_2, kT_3$ has a brightness kB.

15. The method of claim 14 wherein $$B = \sqrt{g_{11}T_1^2 + g_{22}T_2^2 + g_{33}T_3^2 + g_{12}T_1T_2 + g_{13}T_1T_3 + g_{23}T_2T_3}$$

wherein $g_{11}, g_{22}, g_{33}, g_{12}, g_{13}, g_{23}$ are predefined constants, and $g_{11}, g_{22}, g_{33}$ are not equal to zero.

16. The method of claim 14 wherein:
   for each image portion p ($p=p_1, p_2, ...$), the digital data represent coordinates of the color S(p) of the portion p in a first coordinate system, wherein for a color S having tristimulus values $T_1, T_2, T_3$ in a second coordinate system which is said predefined coordinate system, the coordinates of the color S in the first coordinate system are coordinates $S_1, S_2, S_3$, or a linear transformation of the coordinates $S_1, S_2, S_3$, wherein:
   (A) the coordinate $S_1$ is defined by B or
   (B) the coordinate $S_1$ is defined by B and by a sign of a predefined function of one or more of $T_1, T_2, T_3$.

17. The method of claim 16 wherein:

$$B=\sqrt{\alpha_1^2(T_1,T_2,T_3)+\alpha_2^2(T_1,T_2,T_3)+\alpha_3^2(T_1,T_2,T_3)}$$

wherein $$\alpha_1(T_1,T_2,T_3)=\alpha_{11} \times T_1+\alpha_{12} \times T_2+\alpha_{13} \times T_3$$

$$\alpha_2(T_1,T_2,T_3)=\alpha_{21} \times T_1+\alpha_{22} \times T_2+\alpha_{23} \times T_3$$

$$\alpha_3(T_1,T_2,T_3)=\alpha_{31} \times T_1+\alpha_{32} \times T_2+\alpha_{33} \times T_3$$

wherein $\alpha_{11}, \alpha_{12}, \alpha_3, \alpha_{21}, \alpha_{22}, \alpha_{23}, \alpha_{31}, \alpha_{32}, \alpha_{33}$ are predefined numbers such that the following matrix $\Lambda$ is non-degenerate:

$$\Lambda = \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix}$$

18. The method of claim 17 wherein $\alpha_1(T_1,T_2,T_3)$, $\alpha_2(T_1,T_2,T_3)$, $\alpha_3(T_1,T_2,T_3)$ are tristimulus values corresponding to 70%-orthonormal color matching functions.

19. The method of claim 17 wherein:
the value $T_1$ is one of values D, F, F, the value $T_2$ is another one of D, F, F, and the value $T_3$ is the third one of D, E, F, where $$\begin{bmatrix} D \\ E \\ F \end{bmatrix} = A \begin{bmatrix} X \\ Y \\ Z \end{bmatrix}$$

where the matrix A has elements which, up to rounding, are as follows:

$$A = \begin{bmatrix} 0.205306 & 0.712507 & 0.467031 \\ -0.365451 & 1.011998 & -0.610425 \\ 1.853667 & -1.279659 & -0.442859 \end{bmatrix}$$

where X, Y, Z are the coordinates of the color S in the CIE 1931 XYZ color coordinate system for a 2° field;
wherein up to a constant multiple, $\Lambda$ is a 70%-orthonormal matrix.

20. Circuitry for performing the method of claim 1.

21. One or more computer-readable mediums comprising one or more computer instructions to cause a computer system to perform the method of claim 1.

22. A data transmission method comprising transmitting a computer program over a network link, wherein the computer program is operable to cause a computer system to perform the method of claim 1.

23. A data transmission method comprising transmitting a computer program over a network link, wherein the computer program is operable to cause a computer system to perform the method of claim 7.

* * * * *